US012648068B2

(12) United States Patent
Ke et al.

(10) Patent No.: US 12,648,068 B2
(45) Date of Patent: Jun. 2, 2026

(54) DOWNLIGHT POWER BOX CONTROL CIRCUIT CAPABLE OF REALIZING EMERGENCY LIGHTING AND GENERAL LIGHTING

(71) Applicant: SHENZHEN BILLDA TECHNOLOGY CO., LTD, Shenzhen (CN)

(72) Inventors: Jianjun Ke, Shenzhen (CN); Yuyang Zhang, Shenzhen (CN); Peizhi Chen, Shenzhen (CN); Qiu Feng, Shenzhen (CN)

(73) Assignee: SHENZHEN BILLDA TECHNOLOGY CO., LTD, Shenzhen (CN)

( * ) Notice: Subject to any disclaimer, the term of this patent is extended or adjusted under 35 U.S.C. 154(b) by 65 days.

(21) Appl. No.: 18/830,766

(22) Filed: Sep. 11, 2024

(65) Prior Publication Data

US 2026/0046991 A1 Feb. 12, 2026

(30) Foreign Application Priority Data

Aug. 7, 2024 (CN) .......................... 202411079251.3

(51) Int. Cl.
| | |
|---|---|
| *H05B 47/165* | (2020.01) |
| *H02J 9/06* | (2006.01) |
| *H05B 45/325* | (2020.01) |
| *H05B 45/38* | (2020.01) |
| *H05B 47/17* | (2020.01) |
| *F21Y 115/10* | (2016.01) |

(52) U.S. Cl.
CPC ............ *H05B 47/165* (2020.01); *H02J 9/065* (2013.01); *H05B 45/325* (2020.01); *H05B 45/38* (2020.01); *H05B 47/172* (2024.01); *F21Y 2115/10* (2016.08)

(58) Field of Classification Search
CPC combination set(s) only.
See application file for complete search history.

(56) References Cited

U.S. PATENT DOCUMENTS

| | | | | |
|---|---|---|---|---|
| 2012/0326614 A1* | 12/2012 | Tsuji | ...................... | H05B 45/10 |
| | | | | 315/200 R |
| 2013/0127362 A1* | 5/2013 | Trainor | ................... | H02J 9/065 |
| | | | | 324/414 |
| 2013/0147397 A1* | 6/2013 | McBryde | ............... | H05B 45/46 |
| | | | | 315/312 |
| 2022/0131409 A1* | 4/2022 | Zhang | ...................... | H02J 9/061 |

* cited by examiner

*Primary Examiner* — Renan Luque
(74) *Attorney, Agent, or Firm* — HOWARD M COHN and Associates, LLC

(57) ABSTRACT

Disclosed is a downlight power box control circuit capable of realizing emergency lighting and general lighting, comprising a battery, a logic input module and a light-emitting element which are electrically connected to a main control module. The logic input module determines whether a mains voltage is available. In a case where the mains supply supplies power normally, the main control module controls the light-emitting elements to operate according to 100% of a load power. In case of an outage of the mains supply, the battery is used to supply power to a light tube, and the control module controls the light-emitting element to operate according to 30%-50% of the load power to realize emergency lighting.

7 Claims, 7 Drawing Sheets

DOWNLIGHT POWER BOX CONTROL CIRCUIT CAPABLE OF REALIZING EMERGENCY LIGHTING AND GENERAL LIGHTING

BACKGROUND OF THE INVENTION

1. Technical Field

The invention relates to the field of lighting circuits, in particular to a downlight power box control circuit capable of realizing emergency lighting and general lighting.

2. Description of Related Art

Light-emitting diode (LED) tubes are lighting equipment using LEDs as a light source. Compared with traditional fluorescent tubes, the LED tubes have the advantages of higher energy efficiency, longer service life, shorter response time and lower maintenance cost.

Existing LED tubes adopt only one functional circuit, that is, the mains voltage is used as power supplied to LED elements to realize lighting. However, it is found, in actual use, that once a power outage occurs, the LED tubes will not be able to realize emergency lighting. The user experience is poor due to the single function of the circuit adopted by LED lights in the prior art. In view of this, a more reasonable scheme is urgently needed to solve this technical problem.

BRIEF SUMMARY OF THE INVENTION

The invention provides a solution to the technical problem that in the prior art, existing circuits for light tubes have only one function and cannot realize emergency lighting.

To fulfill the above purpose, the invention provides a downlight power box control circuit capable of realizing emergency lighting and general lighting, comprising:

a battery;

a logic input module, wherein the logic input module is connected to a mains supply and used for determining whether an input voltage is in conformity with a value; if so, a first control signal is generated; if not, a second control signal is generated; and a main control module, wherein in response to the first control signal, the main control module controls a light-emitting element to operate according to a first preset power; or, in response to the second control signal, the light-emitting element uses the battery as a driving voltage source and operates according to a second preset power.

As an improvement of the application, the downlight power box control circuit capable of realizing emergency lighting and general lighting further comprises a charging module used for charging the battery, wherein an input terminal of the charging module is connected to the mains supply, and an output terminal of the charging module is connected to the battery.

As an improvement of the application, the charging module comprises a first rectifier bridge, a first transformer, a first resistor, a second resistor and a first triode, wherein an input terminal of the first rectifier bridge is connected to the mains supply, an output terminal of the first rectifier bridge is connected to the first transformer, and the battery is connected to a terminal, away from the first rectifier bridge, of the first transformer;

wherein, a collector of the first triode is coupled to a first connection point between the first transformer and the battery, an emitter of the first triode is grounded, and a base of the first triode is coupled to the first resistor and the second resistor which are connected in parallel; and the main control module comprises a main control chip, and an EN_CH enable pin of the main control chip is coupled to a second connection point between the first connection point and the battery.

As an improvement of the application, the downlight power box control circuit capable of realizing emergency lighting and general lighting further comprises a booster chip, wherein a control enable pin of the booster chip is connected to the battery, and a supplement pin and an input pin of the booster chip are both coupled to a DC-DC PWM enable pin of the main control chip.

As an improvement of the application, the logic input module comprises a second rectifier bridge, a second transformer and a voltage regulator chip, wherein an input terminal of the second rectifier bridge is connected to the mains supply, an output terminal of the second rectifier bridge is coupled to a first transformer coil of the second transformer, and the voltage regulator chip is coupled to a second transformer coil of the second transformer; and a third transformer coil of the second transformer is arranged opposite to the first transformer coil and is connected to a first PWM pin and a second PWM pin of the main control chip.

As an improvement of the application, a first MOS transistor and a second MOS transistor are arranged between the third transformer coil and the main control chip; a drain of the first MOS transistor is coupled to a first electrode, a gate of the first MOS transistor is coupled to the first PWM pin of the main control chip, and a source of the first MOS transistor is coupled to an output terminal of the third transformer coil; and a drain of the second MOS transistor is coupled to a second electrode, a gate of the second MOS transistor is coupled to the second PWM pin of the main control chip, and a source of the second MOS transistor is coupled to an output terminal of the third transformer coil.

As an improvement of the application, the downlight power box control circuit capable of realizing emergency lighting and general lighting further comprises a first optical relay and a second optical relay, wherein an MCU VDD and a first electric reactor are coupled to an input terminal of the first optical relay, and an output terminal of the first optical relay is grounded and connected to a first enable pin of the main control chip; and an MCU VDD and a second electric reactor are coupled to an input terminal of the second optical relay, and an output terminal of the second optical relay is grounded and connected to a second enable pin of the main control chip.

As an improvement of the application, the main control chip is also used for acquiring a voltage of the battery and detecting whether the voltage of the battery is lower than a threshold; if so, the main control module controls the battery to be electrically disconnected from the light-emitting element.

As an improvement of the application, the downlight power box control circuit capable of realizing emergency lighting and general lighting further comprises a second triode and a third MOS transistor, wherein a base of the second triode is coupled to a voltage detection pin of the main control chip, an emitter of the second triode is coupled to SGND, a collector of the second triode is connected to a gate of the third MOS transistor, and a source of the third MOS transistor is connected to BAT+.

As an improvement of the application, a wall switch wall_sw is coupled to the main control module and controls on/off of the light-emitting element in a case where a mains voltage is detected.

The invention has the following beneficial effects: compared with the prior art, the downlight power box control circuit capable of realizing emergency lighting and general lighting provided by the invention comprises a battery, a logic input module and a light-emitting element which are electrically connected to a main control module, wherein the logic input module is connected to a mains supply and used for determining whether an input voltage is in conformity with a value; if so, a first control signal is generated; if not, a second control signal is generated; in response to the first control module, the main control module controls a light-emitting element to operate according to a first preset power, or in response to the second control signal, the light-emitting element uses the battery as a driving voltage source and operates according to a second preset power; the logic input module determines whether a mains voltage is available; in a case where the mains supply supplies power normally, the main control module controls the light-emitting element to operate according to 100% of a load power; and in case of an outage of the mains supply, the battery is used to supply power to a light tube when the mains supply cannot supply power normally, and the main control module controls the light-emitting element to operate according to 30%-50% of the load power to realize emergency lighting, thus satisfying usage requirements of users.

DETAILED DESCRIPTION OF THE INVENTION

Figure 1:
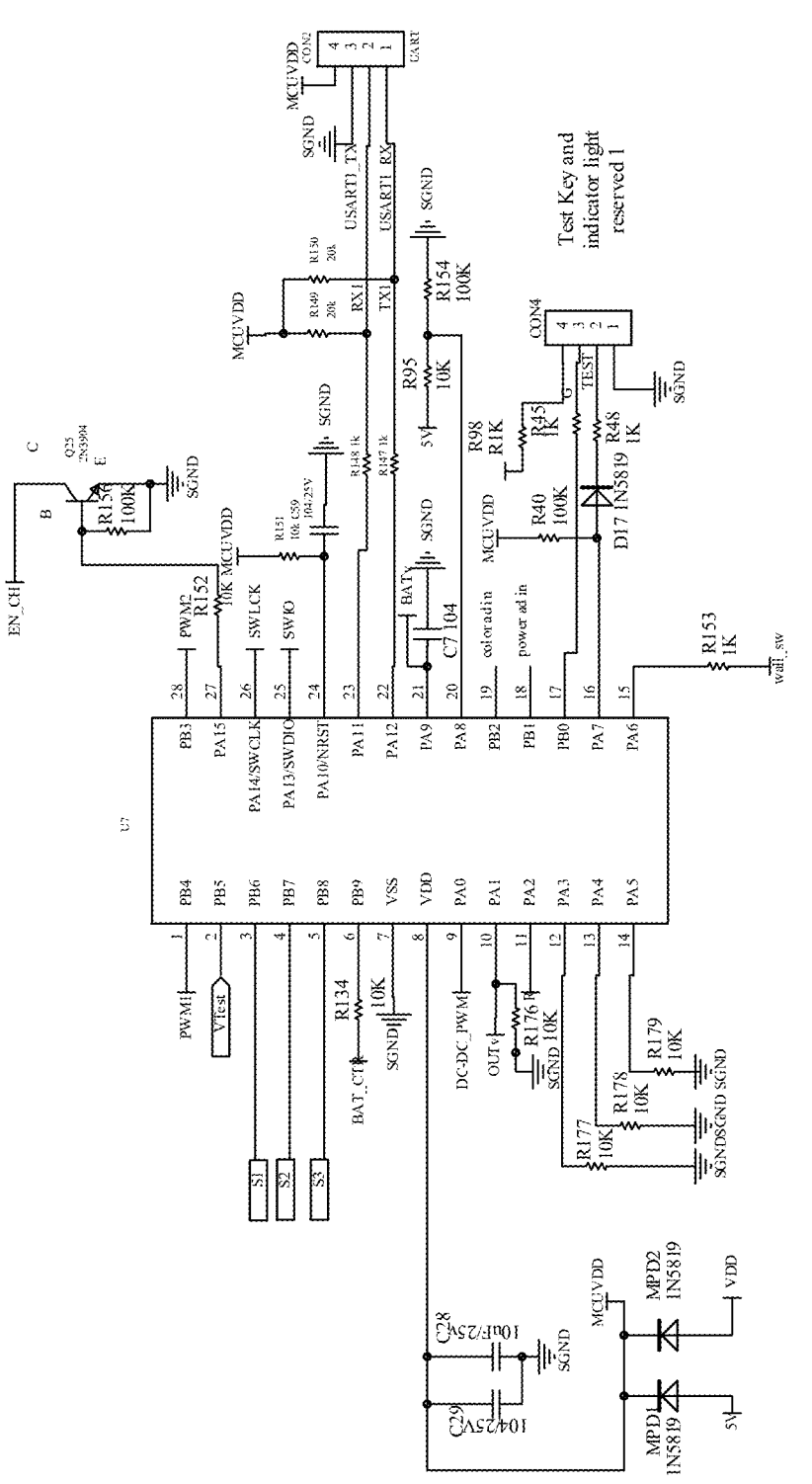
FIG. 1 is a schematic diagram of a main control module according to the invention.
Figure 2:
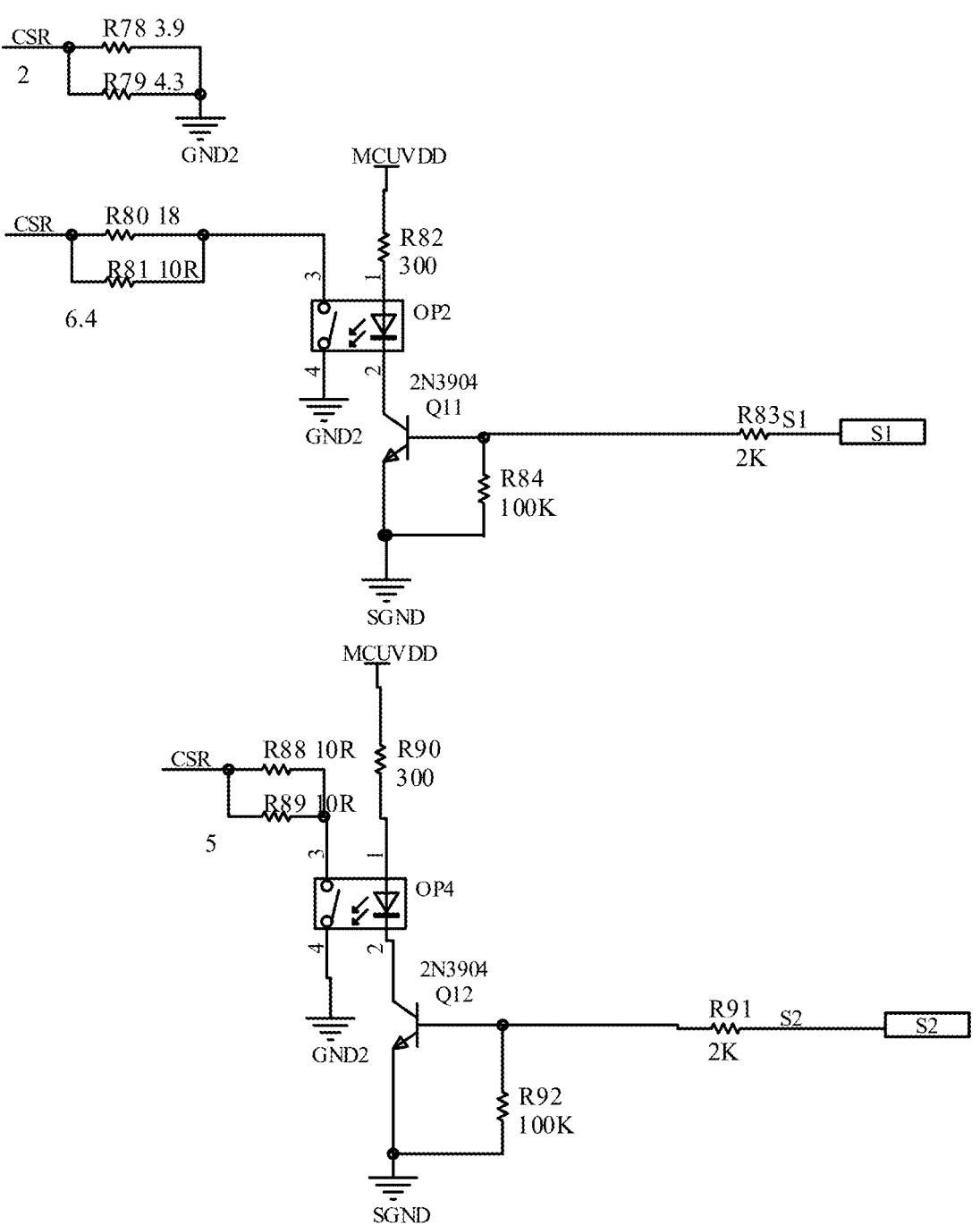
FIG. 2 is a schematic circuit diagram of a first optical relay and a second optical relay according to the invention.
Figure 3:
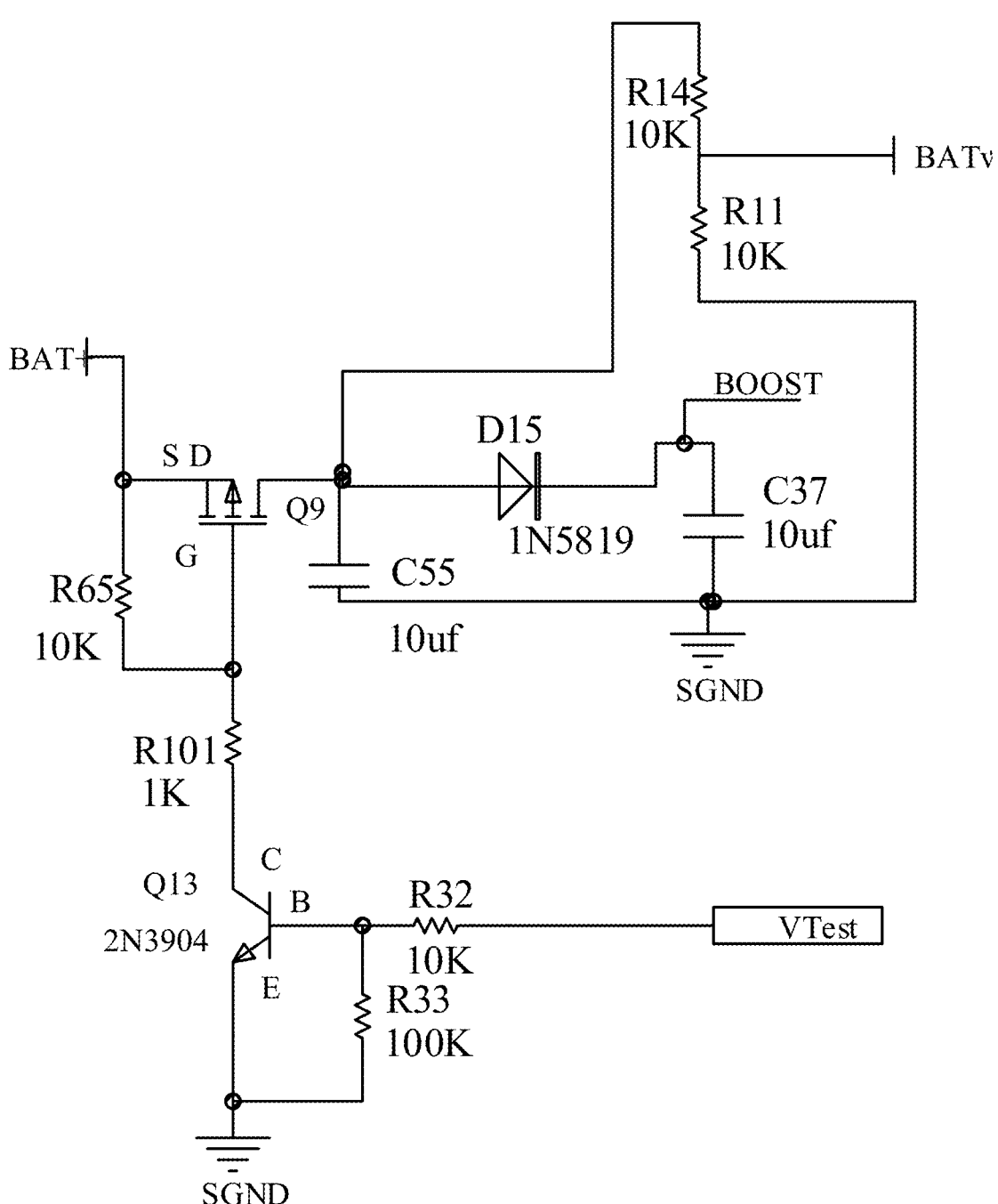
FIG. 3 is a schematic circuit diagram of a third MOS transistor and a second triode according to the invention.
Figure 4:
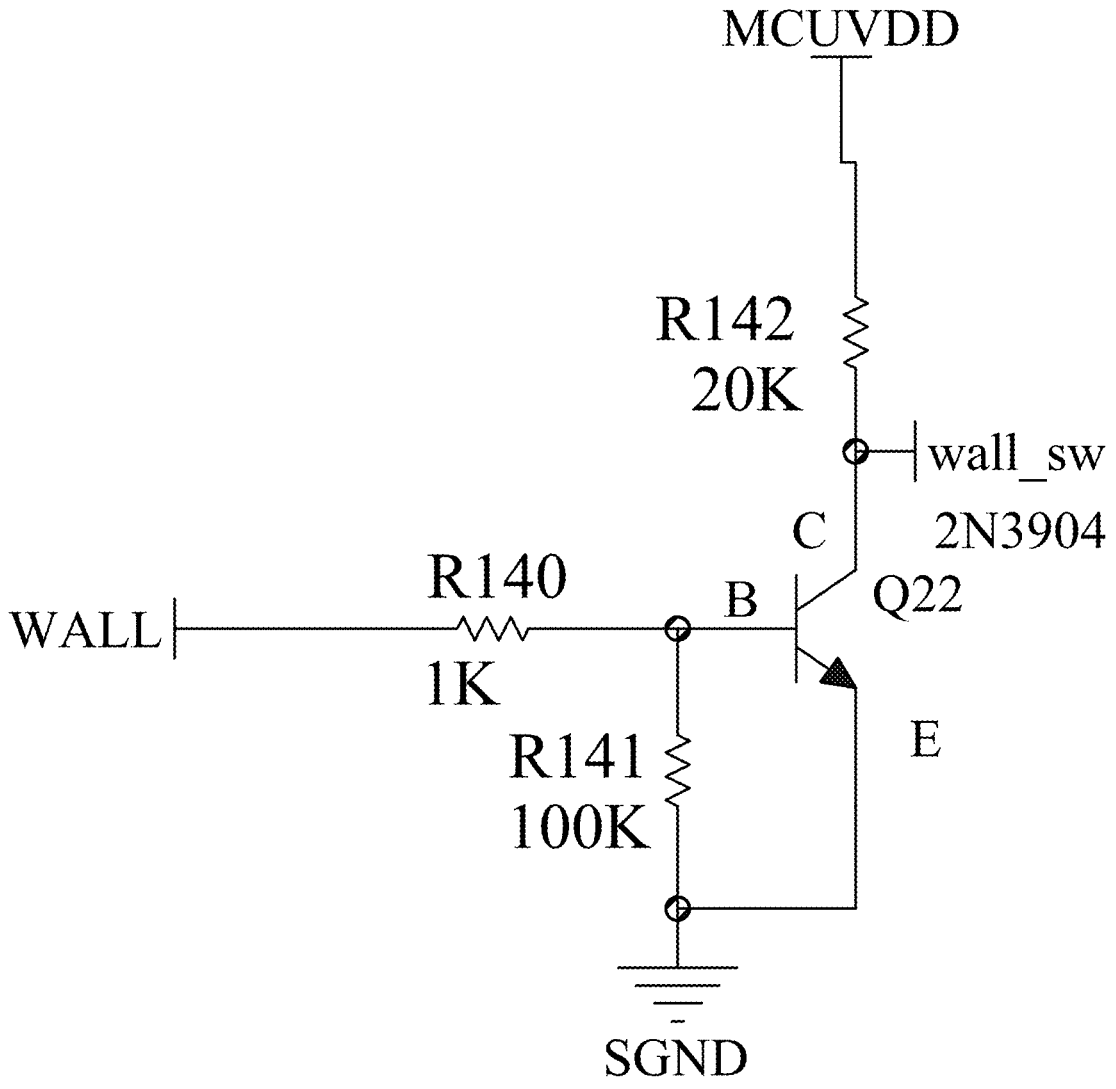
FIG. 4 is a schematic circuit diagram of a wall switch according to the invention.

To more clearly explain the invention, the invention is further described below in conjunction with accompanying drawings.

Details of some embodiments are given in the following description to provide a deeper understanding of the invention. Obviously, the embodiments in the following description are merely illustrative ones, and are not all possible ones of the invention. It should be understood that the following specific embodiments are merely used for explaining the invention rather than limiting the invention.

It should be understood that terms "include" and/or "comprise" used in the description are intended to indicate the presence of features, entireties, steps, operations, elements or modules referred to, and do not exclude the presence or addition of one or more other features, entireties, steps, operations, elements, modules or combinations thereof. Corresponding features related to the circuit involved in the application can be supplemented according to the drawings in the description to interpret the scheme of the application as long as they can be appreciated by those skilled in the art.

To solve the technical problem in the prior art, the application provides a downlight power box control circuit capable of realizing emergency lighting and general lighting. Referring to FIGS. 1-7, the downlight power box control circuit capable of realizing emergency lighting and general lighting comprises a battery, a logic input module and a light-emitting element which are electrically connected to a main control module, wherein the logic input module is connected to a mains supply and used for determining whether an input voltage is in conformity with a value; if so, a first control signal is generated; if not, a second control signal is generated; in response to the first control signal, the main control module controls the light-emitting element to operate according to a first preset power; or, in response to the second control signal, the light-emitting element uses the battery as a driving voltage source and operates according to a second preset power. In a specific configuration, the logic input module, the main control module and the battery are all arranged on a control panel of a power box; the logic input module determines whether a mains voltage is available; in a case where the mains supply supplies power normal, the main control module controls the light-emitting element to operate according to 100% of a load power; and in case of an outage of the mains supply, the battery is used to supply power to a light tube when the mains supply cannot supply power normally, and the main control module controls the light-emitting element to operate according to 30%-50% of the load power to realize emergency lighting, thus satisfying usage requirements of users.

For example, in specific use, the voltage input the mains supply is acquired and detected by the logic input module; if the voltage of the mains voltage is 100 V-277 V, a first control signal is generated, and in response to the first control signal, the main control module controls the light-emitting element to operate according to a first power, that is, the light-emitting element operates at a full-load power (the first power is 100% of a load power), and at this moment, the battery does not work; and in a case where the mains supply cannot supply power normally, the logic input module determines that the voltage input by the mains supply is 0 V, a second control signal is generated, and in response to the second control signal, the main control module controls the battery to work to allow the light-emitting element to operate according to a second power, wherein the second power is 30%-50% of the load power.

In this embodiment, the downlight power box control circuit capable of realizing emergency lighting and general lighting further comprises a charging module used for charging the battery, wherein an input terminal of the charging module is connected to the mains supply, and an output terminal of the charging module is connected to the battery. When the mains supply supplies power normally, the charging module is used to fully charge the battery, such that the situation where the battery runs out of power in an emergency use is avoided.

Figure 5:
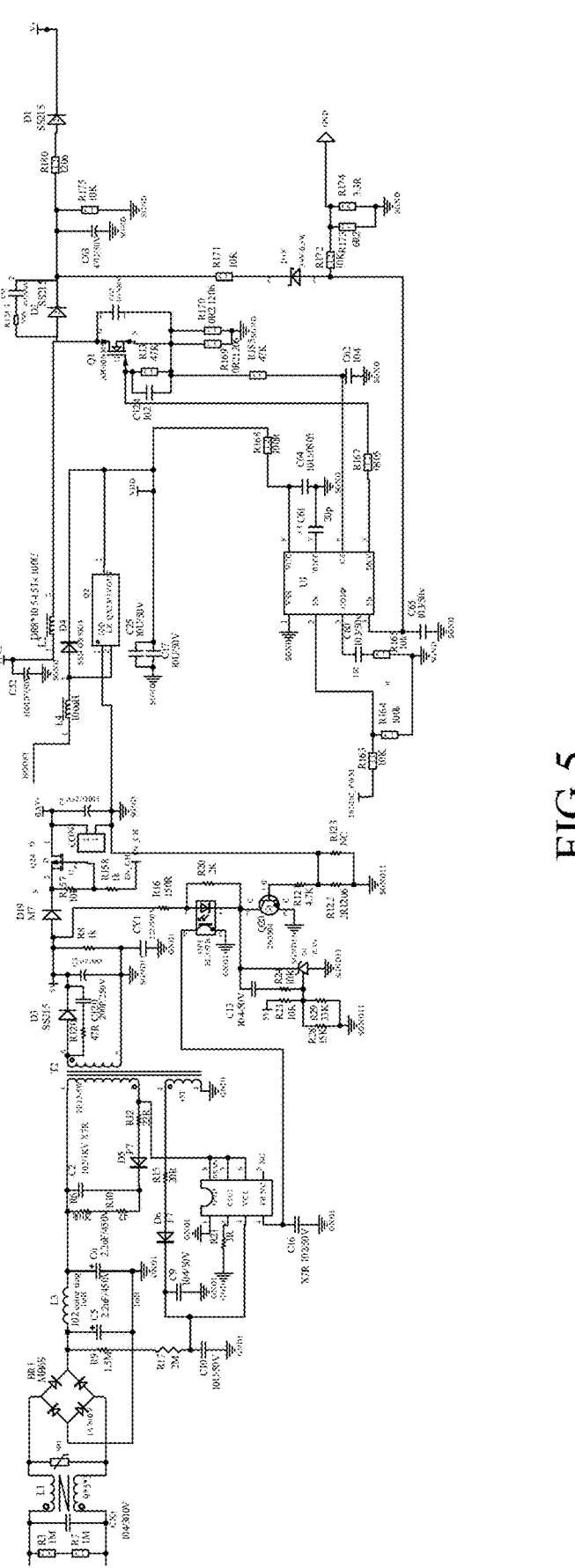
FIG. 5 is a schematic circuit module of a charging module according to the invention.
Figure 6:
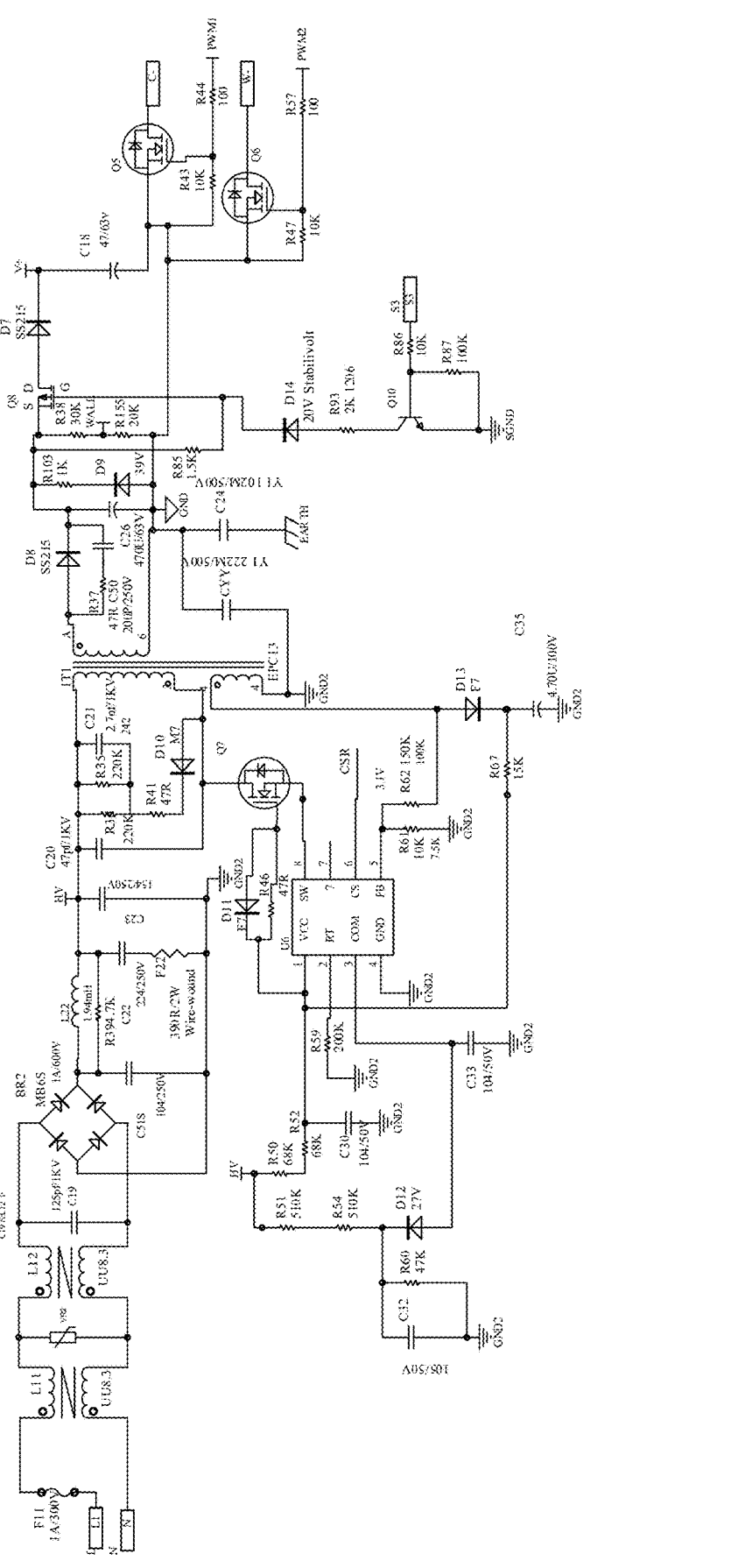
FIG. 6 is a schematic circuit diagram of a logic input module according to the invention.
Figure 7:
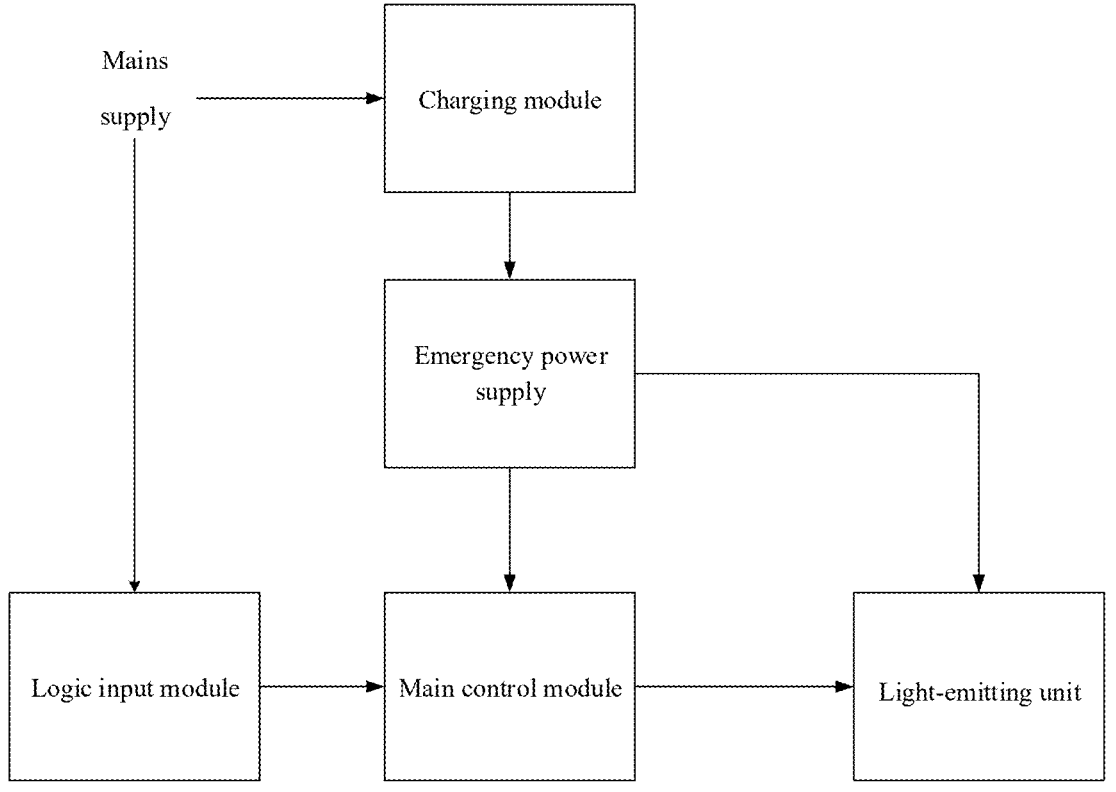
FIG. 7 is schematic diagram of functional modules according to the invention.

In a specific scheme, referring to FIG. 5, the charging module comprises a first rectifier bridge BR1, a first transformer T2, a first resistor R61, a second resistor R62 and a first triode Q20, wherein an input terminal of the first rectifier bridge BR1 is connected to the mains supply, an output terminal of the first rectifier bridge BR1 is connected to the first transformer T2, and the battery is connected to a terminal, away from the first rectifier bridge BR1, of the first transformer T2; wherein, a collector of the first triode Q20 is coupled to a first connection point between the first transformer and the battery, an emitter of the first triode Q20 is grounded, and a base of the first triode Q20 is coupled to the first resistor R61 and the second resistor R62 which are connected in parallel; and the main control module comprises a main control chip U7, an EN_CH enable pin (pin 27 in FIG. 1) of the main control chip U7 is coupled to a second connection point between the first connection point and the battery, wherein the model of the main control chip U7 is MM32F0230, the first control signal and the second control signal are processed by the main control chip U7, and then, the light-emitting element is controlled to operate at different powers with the mains supply or the battery as a driving source. It can be easily understood that the first rectifier bridge BR1 is used for converting an alternating current of the mains supply into a direct current to adapt to the current mode of the element, then the voltage is processed by the first transformer T2 to provide a suitable charging voltage for the battery, and a constant current is obtained by means of the first triode Q20, the first resistor R61 and the second resistor R62 to charge the battery. In a better scheme, a common-mode inductor L1 is arranged between an output terminal of the mains supply and the first rectifier bridge BR1 to make the electromagnetic compatibility satisfy usage requirements; and a color ring inductor L2 is arranged between the first rectifier bridge BR1 and the first transformer T2, and the reasonability of the electromagnetic compatibility is further improved by means of the color ring inductor L2 and the common-mode inductor L1, such that a light tube adopting the circuit can smoothly pass electromagnetic compatibility-related tests.

In emergency use, because the driving voltage provided by the battery is too low to drive the light-emitting element to operate at the second power (30%-50% of the load power), in this embodiment, the downlight power box control circuit capable of realizing emergency lighting and general lighting further comprises a booster chip U1, wherein a control enable pin (pin 7 in FIG. 6) of the booster chip U1 is connected to the battery; and a supplement pin (pin 3 in FIG. 6) and an input pin (pin 2 in FIG. 6) of the booster chip are coupled to a DC-DC PWM enable pin (pin 9 in FIG. 1) of the main control chip U7; and the specific model of the booster chip U1 is QX5305, and means of the booster chip U1, the battery can realize emergency driving of the light-emitting element.

In this embodiment, the logic input module comprises a second rectifier bridge BR2, a second transformer T1 and a voltage regulator chip U6, wherein an input terminal of the second rectifier bridge BR2 is connected to the mains supply, an output terminal of the second rectifier bridge BR2 is coupled to a first transformer coil of the second transformer T1, and the voltage regulator chip U6 is coupled to a second transformer coil of the second transformer; and a third transformer coil of the second transformer is arranged opposite to the first transformer coil and is connected to a first PWM pin (pin 1 in FIG. 1) and a second PWM pin (pin 28 in FIG. 5) of the main control chip U7. It can be easily understood that the second rectifier bridge BR2 has a similar effect to the first rectifier bridge BR1 and is also used for converting an alternating current of the mains supply into a direct current suitable for a light tube adopting the circuit, the second transformer T1 works together with the voltage regulator chip U6, the voltage regulator chip U6 is a 1692 series chip and can freely regulate the duty cycle of the first transformer coil and the second transformer coil to guarantee that an induced current output to the third transformer coil is in conformity with current parameters of the light-emitting element, thus ensuring that a lamp adopting the circuit can emit light normally in a case where the mains supply functions normally.

In a preferred scheme, a first MOS transistor Q5 and a second MOS transistor Q6 are arranged between the third transformer coil and the main control chip U7; a drain of the first MOS transistor Q5 is coupled to a first negative electrode C−, a gate of the first MOS transistor Q5 is coupled to the first PWM pin (pin 1 in FIG. 1) of the main control chip U7, and a source of the first MOS transistor Q5 is coupled to an output terminal of the third transformer coil; and a drain of the second MOS transistor is coupled to a second negative electrode W−, a gate of the second MOS transistor is coupled to the second PWM pin (pin 28 in FIG. 1) of the main control chip U7, and a source of the second MOS transistor is coupled to an output terminal of the third transformer coil. It can be understood that wiring electrodes of a light tube adopting the circuit in the application are two negative electrodes and one positive electrode, the operation time of the first MOS transistor Q5 and the second MOS transistor Q6 is controlled by the PWM technique, and then the color temperature of light is adjusted according to on/off of the first MOS transistor Q5 and the second MOS transistor Q6 to realize pure white light, warm white light, warm yellow light or other operating modes, such that users can obtain more diversified usage modes.

In this embodiment, the downlight power box control circuit capable of realizing emergency lighting and general lighting further comprises a first optical relay OP2 and a second optical relay OP4; an MCU VDD and a first electric reactor are coupled to an input terminal of the first optical relay, and an output terminal of the first optical relay is grounded and connected to a first enable pin (pin 3 in FIG. 1) of the main control chip U7; and an MCU VDD and a second electric reactor are coupled to an input terminal of the second optical relay OP4, and an output terminal of the second optical relay OP4 is grounded and connected to a second enable pin (pin 4 in FIG. 1) of the main control chip U7. The first optical relay OP2 works together with the first electric reactor and the second optical relay OP4 works together with the second electric reactor, such that the main control chip U7 can reasonably regulate the lighting power of the light-emitting element to realize various brightness and color temperatures together with different color temperature schemes, thus improving the usage experience of users.

In this embodiment, the main control chip is also used for acquiring a voltage of the battery and detecting whether the voltage of the battery is lower than a threshold; if so, the main control module controls the battery to be electrically disconnected from the light-emitting element, such that damage of the battery caused by over-discharge is prevented. After being connected to the mains supply, the charging module will be activated correspondingly to charge the battery, such that the battery can turn on a lamp in an emergency.

In a specific scheme, the downlight power box control circuit capable of realizing emergency lighting and general lighting further comprises a second triode Q13 and a third MOS transistor Q9, wherein a base of the second triode Q13 is coupled to a voltage detection pin (pin 2 in FIG. 1) of the main control chip U7, an emitter of the second triode Q13 is coupled to SGND, a collector of the second triode Q13 is connected to a gate of the third MOS transistor Q9, and a source of the third MOS transistor Q13 is connected to BAT+. It can be easily understood that the main control chip U7 acquires the voltage of the battery in real time; when detecting that the voltage of the battery is lower than a preset threshold, the main control chip U7 will control the second triode Q13 to be turned off, and the third MOS transistor Q9 will be turned off accordingly, such that the battery is disconnected from the main control chip U7 to cut off power completely, thus preventing damage of the battery caused by over-discharge and prolonging the service life of the battery.

In a specific scheme, a wall switch wall_sw is coupled to the main control module and controls on/off of the light-emitting element in a case where a mains voltage is detected. For example, when the wall switch wall_sw is in an on state and the logic input module detects that the mains voltage, the main control module controls the light-emitting element to operate based on data acquired by the wall switch wall_sw and the logic input module; when the wall switch wall_sw is in an off state and the logic input module detects the mains voltage, the main control module controls the light-emitting element not to operate based on data acquired by the wall switch and the logic input module. In this way, in a case where the mains supply supplies power normally, users can turn or off a light tube adopting the circuit of the application by means of the wall switch wall_sw; and in a case where mains supply cannot supply power normally, the main control module controls the light-emitting element to operate according to the second power to realize emergency lighting no matter whether the wall switch wall_sw is in the off state or the on state.

The invention has the following advantages:

1. The operation time of the first MOS transistor and the second MOS transistor can be controlled by the PWM technique, and then the color temperature of light can be adjusted according to on/off of the first MOS transistor and the second MOS transistor to realize pure white light, warm white light, warm yellow light or other operating modes, such that users can obtain more diversified usage modes;

2. When the mains supply supplies power normally, the charging module connected to the mains supply can fully charge the battery, such that the situation where the battery runs out of power in an emergency use is avoided;

3. The first optical relay OP2 works together with the first electric reactor and the second optical relay OP4 works together with the second electric reactor, such that the main control chip U7 can reasonably regulate the lighting power of the light-emitting element to realize various brightness and color temperatures together with different color temperature schemes, thus improving the usage experience of users.

Several specific embodiments of the invention are disclosed above, but the invention is not limited to the above embodiments. Any variations that can be obtained by those skilled in the art should also fall within the protection scope of the invention.

What is claimed is:

1. A downlight power box control circuit capable of realizing emergency lighting and general lighting, comprising:

a battery;

a charging module used for charging the battery;

a logic input module, wherein the logic input module is connected to a mains supply and used for determining whether an input voltage is in conformity with a value; if so, a first control signal is generated; if not, a second control signal is generated; and a main control module, wherein in response to the first control signal, the main control module controls a light-emitting element to operate according to a first preset power; or, in response to the second control signal, the light-emitting element uses the battery as a driving voltage source and operates according to a second preset power;

wherein an input terminal of the charging module is connected to the mains supply, and an output terminal of the charging module is connected to the battery;

wherein the charging module comprises a first rectifier bridge, a first transformer, a first resistor, a second resistor and a first triode, an input terminal of the first rectifier bridge is connected to the mains supply, an output terminal of the first rectifier bridge is connected to the first transformer, and the battery is connected to a terminal, away from the first rectifier bridge, of the first transformer;

wherein, a collector of the first triode is coupled to a first connection point between the first transformer and the battery, an emitter of the first triode is grounded, and a base of the first triode is coupled to the first resistor and the second resistor which are connected in parallel; and the main control module comprises a main control chip, and an EN_CH enable pin of the main control chip is coupled to a second connection point between the first connection point and the battery.

2. The downlight power box control circuit capable of realizing emergency lighting and general lighting according to claim 1, further comprising a booster chip, wherein a control enable pin of the booster chip is connected to the battery, and a supplement pin and an input pin of the booster chip are both coupled to a DC-DC PWM enable pin of the main control chip.

3. The downlight power box control circuit capable of realizing emergency lighting and general lighting according to claim 1, wherein the logic input module comprises a second rectifier bridge, a second transformer and a voltage regulator chip, an input terminal of the second rectifier bridge is connected to the mains supply, an output terminal of the second rectifier bridge is coupled to a first transformer coil of the second transformer, and the voltage regulator chip is coupled to a second transformer coil of the second transformer; and a third transformer coil of the second transformer is arranged opposite to the first transformer coil and is connected to a first PWM pin and a second PWM pin of the main control chip.

4. The downlight power box control circuit capable of realizing emergency lighting and general lighting according to claim 3, wherein a first MOS transistor and a second MOS transistor are arranged between the third transformer coil and the main control chip; a drain of the first MOS transistor is coupled to a first electrode, a gate of the first MOS transistor is coupled to the first PWM pin of the main control chip, and a source of the first MOS transistor is coupled to an output terminal of the third transformer coil; and a drain of the second MOS transistor is coupled to a second electrode, a gate of the second MOS transistor is coupled to the second PWM pin of the main control chip, and a source of the second MOS transistor is coupled to an output terminal of the third transformer coil.

5. The downlight power box control circuit capable of realizing emergency lighting and general lighting according to claim 1, further comprising a first optical relay and a second optical relay, wherein an MCU VDD and a first electric reactor are coupled to an input terminal of the first optical relay, and an output terminal of the first optical relay is grounded and connected to a first enable pin of the main control chip; and an MCU VDD and a second electric reactor are coupled to an input terminal of the second optical relay, and an output terminal of the second optical relay is grounded and connected to a second enable pin of the main control chip.

6. The downlight power box control circuit capable of realizing emergency lighting and general lighting according to claim 5, wherein the main control chip is also used for acquiring a voltage of the battery and detecting whether the voltage of the battery is lower than a threshold; if so, the main control module controls the battery to be electrically disconnected from the light-emitting element.

7. The downlight power box control circuit capable of realizing emergency lighting and general lighting according to claim 1, wherein a wall switch wall_sw is coupled to the main control module and controls on/off of the light-emitting element in a case where a mains voltage is detected.

* * * * *